J. F. DAVIS.
SHAFT ATTACHMENT.
APPLICATION FILED NOV. 30, 1909.
975,332.
Patented Nov. 8, 1910.
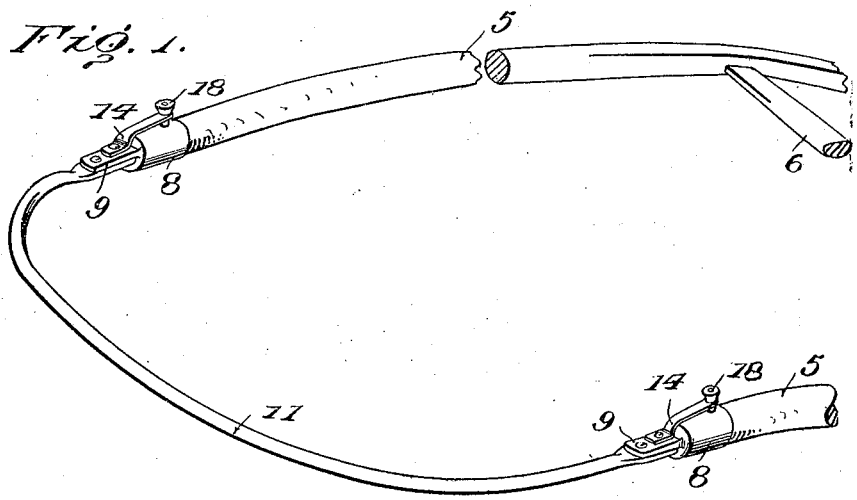
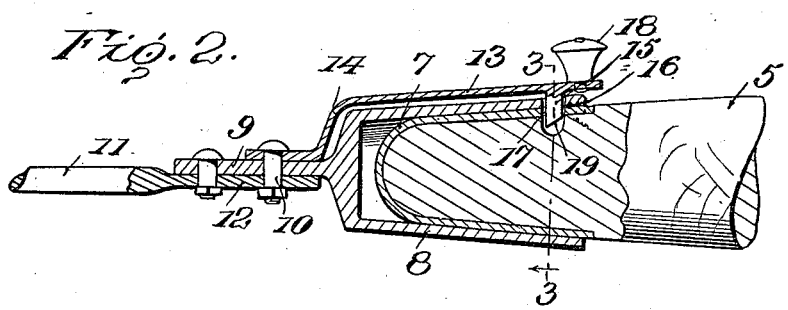
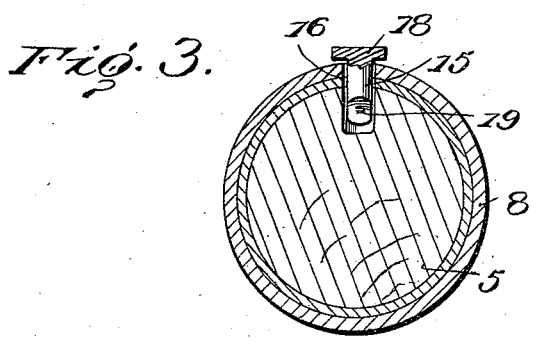
Witnesses
Inventor
J. Frank Davis.
By
Attorneys

UNITED STATES PATENT OFFICE.

JAMES F. DAVIS, OF COALMONT, INDIANA.

SHAFT ATTACHMENT.

975,332.	Specification of Letters Patent.	Patented Nov. 8, 1910.

Application filed November 30, 1909. Serial No. 530,609.

*To all whom it may concern:*

Be it known that I, JAMES F. DAVIS, citizen of the United States, residing at Coalmont, in the county of Clay and State of Indiana, have invented certain new and useful Improvements in Shaft Attachments, of which the following is a specification.

This invention relates to vehicle shafts and more particularly to a yoke or brace for connecting the free ends thereof.

The object of this invention is to provide a comparatively simple and inexpensive device of this character having means for detachable connection with the shafts, and which not only serves to reinforce and strengthen the same but also prevents the lines from catching over the shaft when driving should the tugs break or become accidentally detached from the swingletree.

A still further object of the invention is generally to improve this class of devices to increase their utility, durability and efficiency.

With these and other objects in view, as will more fully appear as the description proceeds, the invention consists essentially in certain constructions, arrangements and combinations of the parts that I shall hereinafter fully describe and claim.

For a full understanding of the invention reference is to be had to the following description and accompanying drawing, in which:—

Figure 1 is a perspective view of a pair of shafts provided with a yoke attachment constructed in accordance with my invention. Fig. 2 is a detail longitudinal sectional view of one of the caps showing the manner of connecting the same to the shaft. Fig. 3 is a transverse sectional view taken on the line 3—3 of Fig. 2.

Corresponding and like parts are referred to in the following description and indicated in all the views of the drawing by the same reference characters.

In the accompanying drawing 5 designates the thills or shafts, having their rear ends connected by a transverse bar 6 and their front ends provided with the usual tips or ferrules 7.

The device comprises spaced caps 8 adapted to fit over the adjacent ferrules 7 and each provided with a reduced shank 9 to which is detachably secured by bolts or similar fastening devices 10, a transverse brace or yoke 11. The intermediate portion of the yoke 11 is preferably curved or bowed outwardly, while the opposite ends thereof are flattened and bear against the inner faces of the adjacent shanks 9, there being spaced perforations formed in the flattened portions 12 of the yoke to permit the passage of the fastening devices 10, as shown.

The yoke or brace 11 not only prevents the lines from catching under the ends of the shafts when driving, but also serves to reinforce and strengthen said shafts and prevent the draft animal from leaving the latter should the tugs break or become accidentally detached from the swingletree.

As a means for detachably securing the yoke 11 in position on the shafts there are provided suitable spring locking members 13, each preferably formed of a flat piece of spring metal, one end of which is offset at 14 and bears against the outer face of the adjacent shank 9 while the other end thereof is provided with a laterally extending locking lug 15 which projects through an opening 16 in the adjacent cap 8 and fits within a socket 17 in the ferrule 7. The free end of each locking member or latch 13 is provided with a finger-piece or button 18, by means of which the latch may be released, so as to permit ready detachment of the yoke when unhitching the horse.

The inner face of each lug 15 is preferably inclined or beveled as indicated at 19, so that when the caps are positioned on the ferrules 7, said inclined faces, by engagement with the ferrules will press the locking members or latches 13 outwardly and thus permit the caps to fit over the ferrules, the spring action of the locking members 13 serving to force the lugs 15 into the sockets 17 when said lugs register with the sockets.

Attention is here called to the fact that the inner or flattened ends of the yoke 11 are secured to the inner faces of the shanks 9, while the offset portions 14 of the locking members are secured to the outer faces thereof, so that one of the fastening devices 10 forms the dual function of retaining both the locking member and yoke in position on the adjacent cap.

By having the yoke 11 detachably secured to the shanks 9 of the caps, should the yoke become broken or otherwise impaired from constant use, the same may be readily detached and replaced by a new yoke. If desired, however, the yoke 11 may be riveted or otherwise rigidly secured to the caps without departing from the spirit of the invention.

The device may be made in different sizes and shapes, and nickeled, japanned, or otherwise coated so as to protect the same from the action of the elements, and also to give the device a neat ornamental appearance.

Having thus described the invention what is claimed as new is:—

The combination with a pair of shafts, of caps fitting over the free ends of the shafts, and each provided with a reduced shank, a yoke connecting the caps, and having its opposite ends provided with flattened portions bearing against the lower faces of said shanks, spring locking members having their outer ends rigidly secured to the upper faces of the shanks and provided with locking lugs adapted to pass through the caps and engage the shafts, and fastening devices passing through the shanks, fixed ends of the spring locking members, and flattened portions of the yoke.

In testimony whereof I affix my signature in presence of two witnesses.

JAMES F. DAVIS. [L. S.]

Witnesses:
   H. H. HAWKINS,
   CLARENCE LIGHT.